INVENTOR
JACQUES BOILEAU
BY
Brumbaugh, Graves, Donohue & Raymond
his ATTORNEYS 3,605,849
TIRE COVER
Jacques Boileau, Clermont-Ferrand, France, assignor to Compagnie Generale des Etablissements Michelin raison sociale Michelin & Cie, Clermont-Ferrand, France
Filed Nov. 13, 1968, Ser. No. 795,759
Claims priority, application France, Nov. 13, 1967, 127,994; Sept. 19, 1968, 166,850
Int. Cl. B60c 9/10
U.S. Cl. 152—356                                    8 Claims

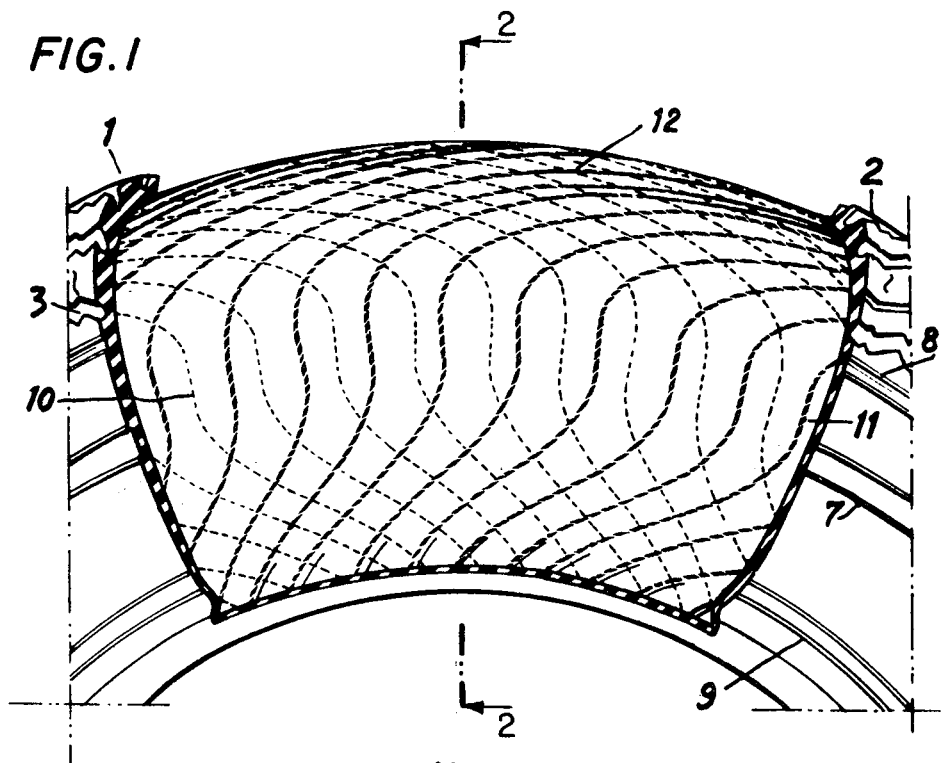
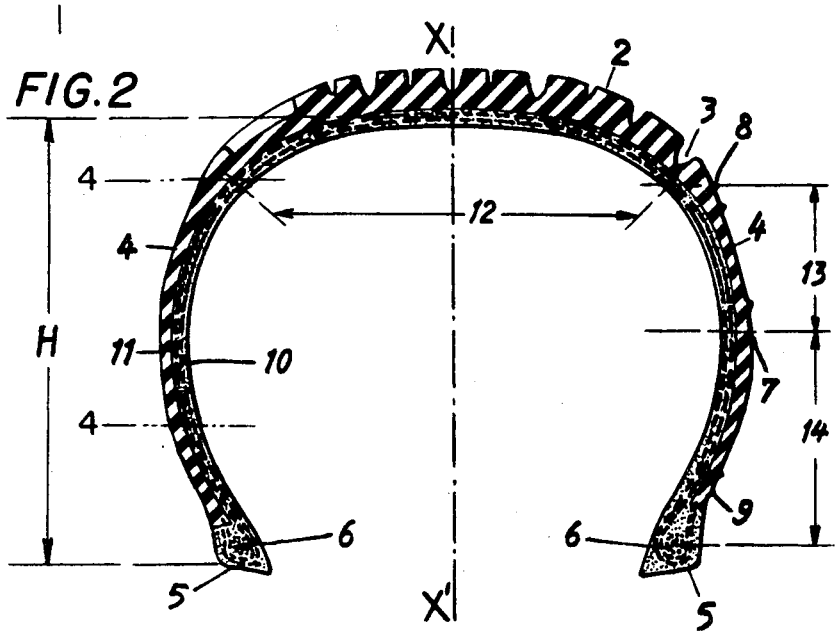

ABSTRACT OF THE DISCLOSURE

A tire cover is formed with continuous cords extending from bead to bead and crossed at the crown and in a portion of the sidewalls. The cords extend in a generally radial direction in a portion of the sidewalls near the shoulder. The result is a tire that has a rigid tread and rigid sidewalls that are in effect flexibly hinged to the tread.

BACKGROUND OF THE INVENTION

This invention relates to tire covers and, more particularly, to tire covers having a novel and highly-effective reinforcement of wires or cords extending from one bead wire to the other, to the reinforcement per se, and to a method of making the reinforcement.

A tire with a reinforcement of crossed wires or cords can be manufactured especially simply and economically. In order to produce a tire of this kind, it is sufficient to position on a manufacturing drum a desired number of plies of sloping wires, to affix a tread to the plies, to shape the cylindrical rough body thus obtained in order to give it the approximate form of the finished tire, and to vulcanize the preliminary body thus shaped in a mold.

Apart from the ease of its manufacture, a tire with a crossed reinforcement has various qualities which are essentially connected with two characteristics: the continuity of the reinforcement from one bead wire to the other, and the rigidity of the sidewalls reinforced by crossed wires which are mutually supporting.

The continuity of the plies facilitates the manufacture and ensures a better connection among the various plies, since they are all anchored to the bead wires.

The rigidity of the sidewalls of a tire with a crossed reinforcement is furthermore an important characteristic giving the tire a noteworthy transverse stability and is the basis of its road-holding ability. It is through the rigidity of its sidewalls that a tire with a crossed reinforcement resists axial drifting in relation to the rim, with or without torsion, as well as the bending of the tread in the area of contact with the ground. The fact that the wires are both crossed and continuous from bead wire to bead wire also facilitates better absorption of impacts suffered by the tread.

However, not all of the qualities of a tire with a crossed reinforcement are good, and the rigidity of its sidewalls is also at the root of its most serious shortcomings. For the sake of passenger comfort, a tire with a crossed carcass reinforcement must have a tread and peak or crown connecting the two sidewalls sufficiently deformable so as to be able to participate in the yielding that the tire undergoes upon impact. Towards such end, the tread and the portion of the reinforcement immediately underneath must be able to contract. This has various consequences regarding the behavior of the tire and the structure of its reinforcement.

As concerns the behavior, because the tread deforms by contracting during its contact with the ground, an abrasion is produced that accelerates wear and tear in comparison to the wear and tear resulting from rolling without such deformation, and there also results a certain loss of road-holding ability. Furthermore, because of the lack of rigidity of the peak of the tire, the peak offers little resistance to bending due to transverse stresses, for example when taking a curve, under the effect of centrifugal force. The tire then lacks road-holding ability as the sidewalls, notwithstanding their rigidity, are unable to give it good road-holding power.

As concerns the structure of the reinforcement, it is necessary, in order to render the peak or crown of the tire deformable, to forego all structure that would result in a peak of little deformability. Thus, one cannot use wires or cords placed at a small angle with the longitudinal plane of symmetry, or cords that are very close to one another or even adjoining under the tread, or cords imbedded in hard rubber. Instead of using underneath the tread cords placed at a small angle, ranging, for example, around 15° to 20°, as in tires with a radial carcass reinforcement, one uses wires or cords placed at an angle ranging around 35° in the region of the reinforcement in which the cords form the smallest angle with the longitudinal plane.

SUMMARY OF THE INVENTION

An object of the invention is to preserve the characteristics that are desirable in a tire with a crossed reinforcement (continuity of the reinforcement and rigidity of the sidewalls), which characteristics had to be given up in the radial-carcass-type tire, and to eliminate the disadvantages that have heretofore characterized a tire having such structure. The foregoing and other objects of the invention are attained by the provision of a tire having a reinforcement that is continuous and flexible as a whole and comprises sidewalls and a crown or peak that are as rigid as possible.

More particularly, a tire cover in accordance with the invention, of the crossed-reinforcement type, comprises an even number of continuous cord plies extending from one bead wire to the other, the bead edges of each such ply being anchored around the bead wires. The tire cover is characterized in that the reinforcement comprises in each sidewall a bending zone that is flexible in relation to the rest of the reinforcement, extending over part of the height delimited by the portion of the reinforcement that is of maximum axial displacement from the median plane of the tire and the portion of the reinforcement located underneath the peak which has a maximum transverse curvature. In each bending zone the cords of the plies are directed radially or do not deviate by more than 15° from the radial direction. The cords of the plies deviate by more than 15° from the radial direction over their remaining path, and are inclined with respect to the longitudinal direction by from 20° to 60° over all or almost all of the region in the sidewall that extends from the tire bead wire to the portion of the reinforcement with the maximum axial displacement from the median plane of the tire, and by from 10° to 30° over all or almost all of the region of the reinforcement extending from the two adjacent zones of the peak to the region of maximum transverse curvature.

Thus, in accordance with the invention, there is provided in each sidewall, between the shoulder and mid-sidewall, a kind of hinge or gusset that permits articulation between a rigid peak and a rigid sidewall portion. A narrow zone of flexibility is sufficient to assure the proper elasticity of the aggregate of the reinforcement, such reinforcement then being constituted by central and lateral portions that may be made as rigid as desired.

In comparison with conventional crossed-reinforcement tire covers, the tire cover in accordance with the invention is distinguished by the presence in each side wall of a bending or hinge zone assuring radial flexibility of the reinforcement. The separation between the peak and the sidewalls permits the peak to be rendered considerably more rigid. At the same time, the tire cover in accordance with the invention preserves the continuity of the reinforcement and the rigidity of the sidewall assembly of the conventional tire. As a result, in comparison to the conventional tire cover having crossed plies, the tire cover in accordance with the invention has considerably improved road-holding ability, adherence and resistance to wear and tear and is characterized by less rolling energy consumption. Also, the tire is more comfortable because of the increased radial flexibility provided by the hinge portion. Finally, the tire is better able to withstand rolling at high speeds.

In comparison to the classical radial-carcass tire, the tire in accordance with the invention is distinguished in that the rigidity of the reinforcement of the tire, both at the peak and possibly in the bead, is ensured by plies that extend continuously from one bead wire to the other, and not by additional reinforcements in special locations in some areas of the tire and having free ends: i.e., ends that are not anchored over the bead wires. Furthermore, the cover in accordance with the invention does not comprise radial cords or wires over the entire height of the sidewall—i.e., from the peak to the bead wire—but only over a narrow zone located between the shoulder and about mid-sidewall. In accordance with the invention, it is indeed essential to arrange the reinforcing cords or wires in crossed relation between the bead wires and approximately mid-sidewall, as in tires with a conventional crossed reinforcement. The effect of these differences between the radial carcass tire and the tire in accordance with the invention is manifested in the following advantages provided by the invention, and especially by the stiffening of the sidewalls:

better later stability, especially at high speeds;
better comfort through absorption of impacts;
better sustained and progressive resistance to drifting;
increased speed limit;
simplified manufacture and possibly reduction of the weight of the reinforcement.

BRIEF DESCRIPTION OF THE DRAWING

Additional aspects of the invention may be understood by reference to the following detailed description of representative embodiments thereof, taken in conjunction with the accompanying figures of the drawing, wherein:

FIG. 1 is a perspective view, partly broken away, of a sector of a tire in accordance with the invention;

FIG. 2 is a radial cross section through the line 2—2 in FIG. 1 and looking in the direction of the arrows;

DESCRIPTION OF THE PREFERRED EMBODIMENTS

Figure 2A:
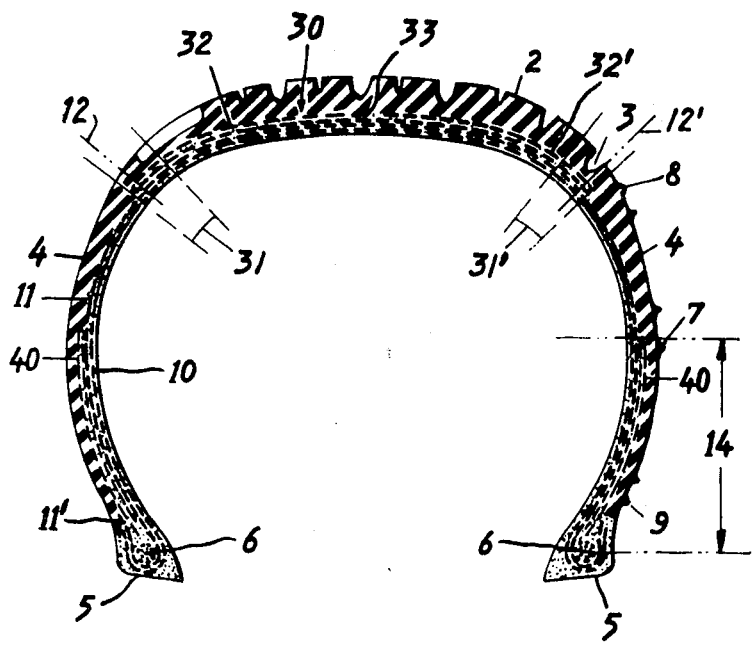
FIG. 2A is a view similar to FIG. 2 showing a modification of the tire of FIG. 2.
Figure 3:
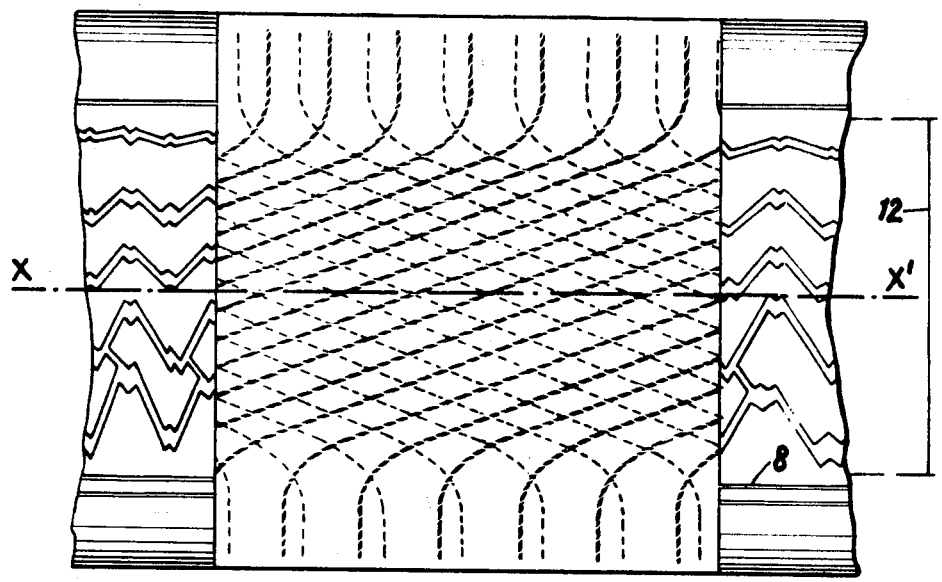
FIG. 3 is an outside plan view of the tire shown in FIG. 1.

FIGS. 1, 2, 3 and 4, drawn from ordinary photographs (FIGS 1 to 3) and X-ray photographs (FIG. 4), show a tire 1 comprising a tread 2 provided with the moldings 3 extending into two sidewalls 4 each ending in a bead 5 containing a bead wire 6. Mid-sidewall, corresponding substantially to the area of maximum axial width or displacement of the tire, is marked by a circular rib 7 in relief. The shoulder—i.e., the zone of maximum curvature of the reinforcement—is at the level of the circular rib 8. Another circular rib 9 indicates the level underneath which the bead is to come in contact with the rim. The height of the carcass is indicated by the reference line H in FIG. 2.

As shown in FIG. 2, the reinforcement of the tire consists solely of the two plies 10 and 11 extending without interruption from one wire to the other. Both plies are anchored over the bead wires 6 and end at a short distance above the bead wires, approximately at the level of the rib 9.

FIG. 1 shows clearly that the outer ply 11 and the inner ply 10 comprise cords the path of which consists of essentially three zones (for the sake of clarity, only one wire out of about ten is shown). In the zone of the tread, the wires 10 and 11 comprise a portion 12 in which they are practically straight-lined and form an angle of 19½° with the median plane X–X' in the vicinity of the plane. In the zone between the ribs 7 and 8, the wires 11 and 10 comprise a portion 13 in which they are directed radially or substantially radially. The connection with the adjacent zones is effected in the vicinity of the ribs 7 and 8 by a portion of progressive inclination.

Figure 4:
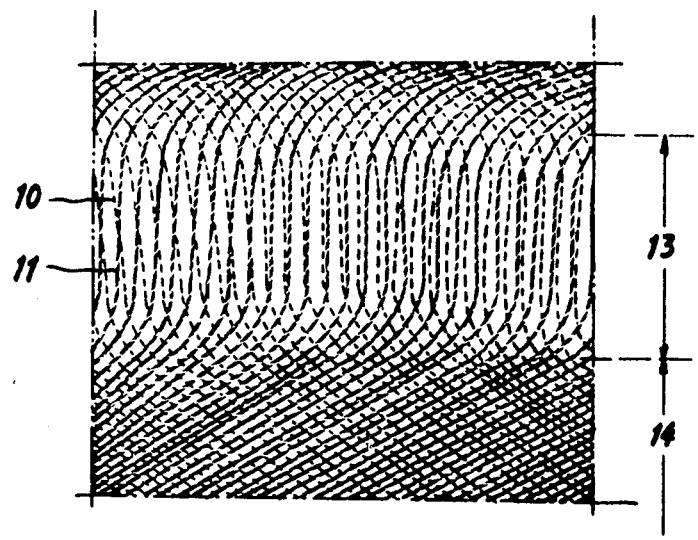
FIG. 4 is a side elevation, limited to the zone 4—4 of FIG. 2, drawn in accordance with an X-ray photograph of the tire of FIGS. 1, 2 and 3.

FIG. 4, made on the basis of X-ray photography, shows the exact configuration of the wires 10 and 11 (all shown) in the portion 13. The parallelism of wires 10 and 11 is not strict, either in the same ply or as between the two plies. Finally, in the zone between the rib 7 and the bead wire 6, the wires 10 and 11 comprise a portion 14 in which they form with the parallel circles or lines of "latitude" of the tire an angle which appears because of perspective to be constant and close to 30° but which in reality is larger and increases in the direction from a zone adjacent to the rib 7 to the bead wire 6, where it attains a value of approximately 50°.

The zone 13 of flexible bending that is reinforced with radial or substantially radial cords or wires 10, 11, provided in each sidewall 4 between the rib 8 and approximately mid-sidewall 7, may have a height that is reduced to one-fourth or one-third of the total height of the reinforcement measured between the tire bead wires 6 and the peak. In this zone 13, cords running exactly in the radial direction may be provided. However, it is also possible to reduce the strictly radial portion of each cord in the flexible zone to a very short length, even to a single point at which the cord is tangent to a radial plane and on either side of which the cord is inclined with respect to the radial planes at an angle limited to ±15° in the zone of flexibility, either in the same direction or in different directions.

Each radial or substantially radial portion of the cords 10, 11 constitutes a short length of each cord, ranging from approximately 1% to 12% of their total length and being preferably close to 5%.

On either side of the zone 13 of flexibility, the cords 10, 11 deviate rapidly from the radial or substantially radial direction they have in the zone 13. In the direction of the bead wire 6, the angle formed by the cords 10, 11 with the longitudinal direction decreases rapidly to a value ranging from 20° to 30°. After this minimum value, the angle, as in a tire with a conventional crossed reinforcement, increases until it attains a maximum value ranging from 45° to 55° at the level of the bead wire.

In the direction of the tread 2, the angle formed by the wires 10, 11 with the longitudinal direction attains for all practical purposes its minimum value at the rib 8—i.e., in the zone of maximum transverse curvature—and from then on remains practically constant as far as the opposite shoulder. Underneath the tread 2, the wires or cords 10, 11 of each individual play are preferably "blocked" against one another: i.e., compressed to the point of becoming joined, whereby the connecting rubber between consecutive wires or cords penetrates the intervals between fibers or strands forming the wires or cords. The inclination of the cords with respect to the longitudinal median plane of the tire ranges by preference from 10° to 20°.

The tire covers in accordance with the invention may be provided with a reinforcement consisting of natural, artificial, synthetic or mineral textile threads (cotton, rayon, polyamide, polyester, glass, etc.) or metal cords, especially elastic metal cords. These are preferred to generically in the appended claims as "cords." The plies of cords can be homogeneous. However, in order to improve the density of the cords in the radial zone, it may be of advantage to use heterogeneous plies comprising two layers of cords, one of them consisting of cords that do not contract when hot, and the other of cords contracting when hot, such as described in French Pat. 1,452,730 or its certificate of addition No. 90,220. In this manner, the cords can interpenetrate in the zone in which they are spaced apart most, i.e., in the radial zone, and rubber bridges that are too large can thus be avoided between the cords.

The number of plies, which of necessity must be even, may be as low as two. By preference, but not necessarily, two successive plies are arranged symmetrically.

Even though the invention provides primarily for a reinforcement consisting exclusively of plies of cords that are continuous from bead wire to bead wire, the scope of the invention is not exceeded by placing over the reinforcement comprising continuous plies some partial reinforcements in certain areas, either under the tread or in any part whatever of the sidewall.

For example, it is desirable to strengthen the reinforcement locally within a zone that is delimited at least on one side by a circumferential line of change of direction of the wires, by means of at least one ply that is folded back and that includes cords placed at the same angle as the cords of the reinforcement in the same zone. In this embodiment, the circumferential line of change of direction preferably coincides approximately with the folding line of the additional ply.

In another embodiment, the crown of the cover is fortified by one or more folded-back plies the fold or folds of which are located at the border of the zone or zones in which the cords of the reinforcement are arranged radially, the angle of the cords of the folded-back ply being the same as the angle of the cords of the reinforcement under the crown. The folded-back ply or plies can be placed under, over or between the reinforcement plies. They may extend either under the entire width of the peak, in which case one can use a single ply that is folded back along the two edges of the peak, or under part of the width of the peak.

It is likewise possible to reinforce the sidewalls in a similar manner, either in the zone in which the carcass cords are oblique or crossed, or also in the zone in which they are placed radially.

The use of local reinforcements formed of folded plies has various advantages. First, one effect of these reinforcements is that the tension of the cords of the reinforcements become uniform during shaping. The crease of a folded-back ply provides a physical reference for the line of change of direction of the cords of the reinforcement and the result is a better parallelism of the cords of an individual ply of the reinforcement all around the tire from bead to bead. Furthermore, the change of direction of the cords of the reinforcement becomes less progressive and one obtains a straighter line in the radial zone and in the adjacent zones, which improves the flexibility of the radial zone and the rigidity of the crossed zones.

Second, a crown ply with folded-back edges facilitates an additional reinforcement of the crown, mainly on the edges of the tread, thereby providing better road-holding ability and better resistance to wear and tear by preventing "knots" of meshes formed by the wires of the reinforcement from being deformed, mainly on the edges of the tread. A similar advantage may be obtained in the zones of the sidewalls in which the wires are crossed.

Furthermore, one may provide in a tire in accordance with the invention protective plies, known in themselves, limited to the region of the tread, protecting the reinforcement against shocks, or also a reinforcement of the beads protecting them from rubbing against the rim, as has been provided customarily in tires with a crossed reinforcement.

The embodiment shown in FIG. 2A is distinguished from the embodiment in FIGS. 1, 2, 3 and 4 in that the reinforcement constituted by the plies of cords 10 and 11 is fortified by a crown ply 30 comprising two U-shaped portions 31 and 31' placed on the edges of the peak and extending into the portions 32, 32' and 33. The cords of the portion 33 and of the portions 32 and 32' form substantially the same angle as the cords of the reinforcement 10 and 11 in the region of the crown between the edges 12 and 12' of the tread.

It is possible to eliminate from the peak ply 30 either the portions 32 and 32', preserving only the folded portions 31 and 31' and the center portion 33, or the portions 32, 32' and 33, preserving only the portions 31 and 31' and giving the portions 31 and 31' greater or lesser width. In practice, such width should not be less than approximately 8 mm.

Furthermore, in the zone 14 of the sidewalls, there is placed a folded-back ply 40 the crease of which is at the level of the rib 7. The width of this folded-back ply should not be less than approximately 8 mm. If it is very wide, it is preferable that the ends of the ply be placed, in a manner known in itself, between the carcass cords 11 and their winding 11' about the bead wire 6.

From FIGS. 1 to 4 it becomes clear that the tire in accordance with the invention is essentially a tire with a crossed reinforcement comprising, however, in each sidewall a short zone of flexibility having a radial reinforcement that makes it possible to modify in a highly beneficial way the interaction of a rigid peak and rigid sidewalls. The portions 13 of the cords 10 and 11 serve as flexible joints or connections between the portions 12 and 14, the latter being rendered rigid by crossing the wires and by a suitable choice of wire angles. This effect is, moreover, obtained without any interruption of the cords 10 and 11 from bead wire to bead wire.

In addition to a special structure of the reinforcement of tire covers, the present invention also covers the means to obtain such reinforcement.

Since one desires to obtain in a simple manner the traces or shapings desired for each wire, it is, of course, advisable to eliminate all methods that involve the laying of cords individually or the manufacture of the reinforcement by means of a core. Indeed, the only industrially acceptable method is production of the reinforcement over a drum, followed by a shaping in order to give the reinforcement produced in the form of a cylindrical rough body the approximate shape it will have in the finished tire.

It has been found that the structure of the reinforcement described above can be obtained by a conventional building operation on a drum followed by a shaping operation, provided that one starts out with plies or cords in a special arrangement. The deformation of these plies laid in advance over cylindrical surfaces leads on shaping to the desired structure.

The method in accordance with the invention for obtaining a cover with a reinforcement of crossed cords including a zone of radial cords comprises using plies of oblique cords including zones of perpendicular cords—i.e., cords running perpendicularly to the edges of the plies, such zones corresponding to the areas of the reinforcement including radial cords.

Thus, the plies to be used in accordance with the invention consist of cords placed in broken lines composed of a number of segments some of which are perpendicular to the edges and others of which are inclined, preferably all at the same angle, with respect to the edges. Ordinarily, one uses two intermediate perpendicular segments and three oblique segments a center segment of which corresponds to the tread and the other two of which correspond to portions of the sidewalls. In the center segment, the cords can have an inclination which is either parallel to their inclination in the lateral segments or symmetrical to them.

During fabrication of a tire reinforcement on a drum, it is of course suitable to superimpose plies in accordance with the invention by alternating from ply to ply the directions of the angles of the cords of the segments having inclined cords and by having the segments with perpendicular cords coincide.

In order to obtain a portion in the sidewall of a desired length wherein the cords are radial, it is advisable to use plies of cords in which the cords are inclined over the larger part of their length and perpendicular over a portion of their total length ranging from 1% to 25%. This proportion must be reduced in order to manufacture tires with a short zone of flexibility, such as described above.

The angle of the cords in the segments with inclined cords is provided in such a manner as to obtain by means of shaping an angle at the peak ranging around 15°, taking into account the shaping ratio: i.e., the ratio of the diameter of the tire cover at the peak and at the level of the bead wire. For a shaping ratio of close to 1.5, one will choose an angle of laying of about 50°, and in any case within the range of 45° to 55°. In order to obtain "blocking" of the cords at the peak, it is advisable to select plies the pitch of the cords of which—i.e., the spacing between the wires of which from center to center—is less than double the diameter of the cords, for the customary shaping ratio of about 1.5.

The plies with off-set inclined cords can be obtained in various ways from plies of customarily inclined cords. They can be obtained, for example, by winding a ply of inclined cords over a drum or cylinder composed of several elements capable of angular displacement with respect to one another around their common axis as well as axial displacement separating them from one another. In this manner, one achieves a combined torsion of longitudinal bands which produces their being set off while the direction of the cords in the intermediate bands is made perpendicular. In order to facilitate the forming of bends by the cords, it is of advantage to heat the ply in the point of change of direction, in order to render the rubber more pliable there. The setting off of the cords of a commonly inclined ply may even be executed on the make-up drum, on making up the reinforcement, as will be indicated further on.

A ply of off-set inclined cords may also be obtained in a continuous manner from a common inclined ply of undetermined length by causing it to circulate between rollers with slightly divergent axles so as to achieve constant longitudinal setting-off and a transverse moving apart of the zones of inclined cords.

The fabrication of reinforcements in the form of folded-back plies, as provided by the invention, does not present any special difficulties. These plies are provided by means of the drum used for make-up in that the folds are made to coincide approximately with the lines of change of direction of the cords of the reinforcement. The cords of the reinforement plies and the fortifying plies in the zones of superimposition are then placed at the same angle in relation to the axis of the make-up drum.

Figure 5:
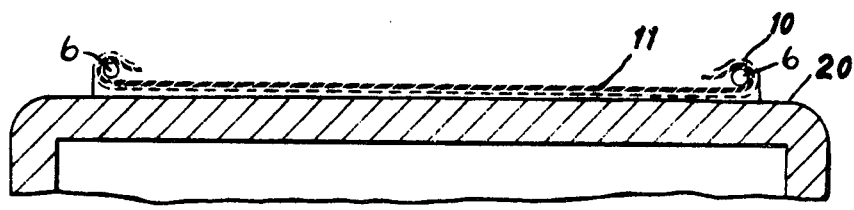
FIGS. 5 and 6 are cross-sectional and developed plan views, respectively, showing portions of reinforcement plies of the tire in accordance with FIGS. 1 to 4 arranged on a make-up drum.
Figure 6:
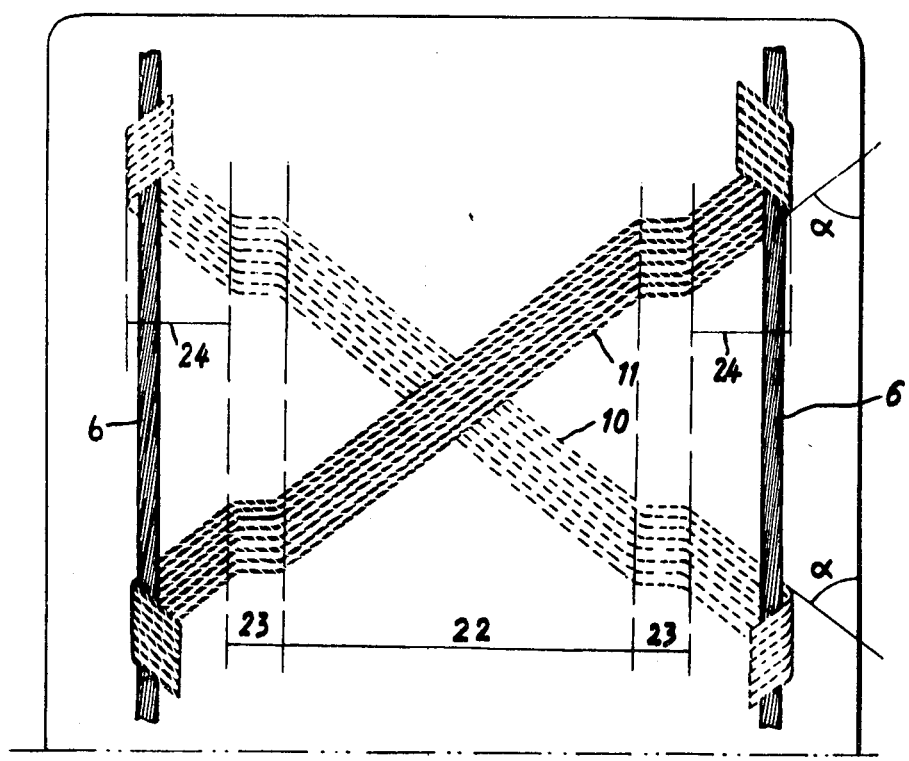

FIGS. 5 and 6 show a method of manufacturing a tire in accordance with the invention.

The plies 10 and 11 have been wound around the make-up drum 20 and their ends have been folded back over the two bead wires 6. For the sake of clarity of the drawing, only a narrow portion of each ply is shown in FIG. 6.

The cords 10 and 11 each comprise two portions 23 in which these cords are perpendicular to the bead wires 6 and one portion 22 and two portions 24 in which they are inclined and laid at an angle alpha of 52½°. These portions 22, 23, 24 correspond approximately to the portions 12, 13, 14 in FIGS. 1 to 4, the portions 13 being obtained with the portions 23 plus a small part of portions 22 and 24. In the case of a tire size 165 x 380, the total width between bead wires is approximately 560 mm., the width of portion 22 is approximately 327 mm., and the width of each portion 23 is approximately 34 mm. It may be seen that each portion 23 corresponds to a small fraction of the total width of the ply as well as the total length of the cords. In the case shown in FIG. 6, the length of the cords in each of the portions 23 is only approximately 6% of the total length of the cords of ply 11.

Figure 7:
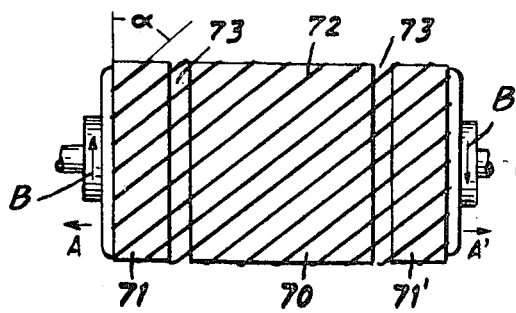
FIGS. 7 to 12 are schematic diagrams of a roller comprising several elements and plies of cords laid thereon during successive phases of modification of the path of the cords during manufacture of a tire in accordance with the invention.

The manufacture of plies such as the plies 10 and 11 and of other plies in accordance with several embodiments of the invention is illustrated by FIGS. 7 to 12. FIG. 7 shows a ply 72 of cords inclined in a conventional manner, wound about a cylinder comprising three coaxial rings of the same diameter, namely one center ring 70 and two lateral rings 71 and 71'. The center ring 70 is separated from each of the lateral rings by an axial space 73. By means of a suitable conventional mechanism (not shown), it is possible to impart to the lateral rings 71 and 71' a rotation with respect to the center ring 70 about the common axis and a movement of axial translation making it possible to reduce or increase the axial space 73 between the ring 70 and the rings 71 and 71'. These movements of rotation and translation are preferably effected simultaneously.

In one embodiment, the ply 72 is caused to adhere to the three rings 70, 71, 71' in such a manner as to make the parts of the ply 72 integral with the rings over the entire surface of the rings so that all zones of the ply 72 in contact with any one of the rings follows the motion of such ring.

Figure 8:
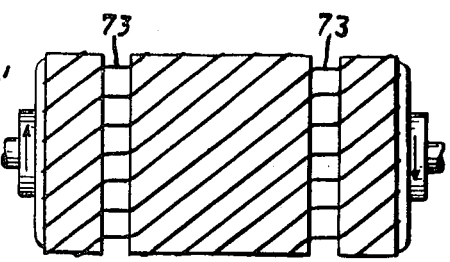
Figure 9:
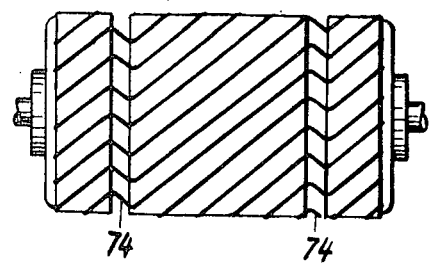
Figure 10:
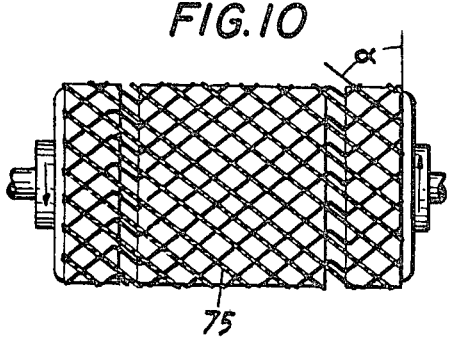

By leaving the ring 70 immobile, by having the rings 71 and 71' turn in the directions of the arrows B and B' in FIG. 7, and by displacing them axially in the directions of the arrows A and A', one obtains the configuration shown in FIG. 8. If alpha is the angle formed by the cords of ply 72, L the length of the wires in the space 73 between the rings, and R the radius of the rings, the rings must be turned by an angle beta, so that $$\text{Beta} = \frac{L \sin \text{alpha}}{R}$$

beta being measured in radians. At the same time, the rings must be separated by $L(1 - \cos \text{alpha})$. The movement of rotation and the movement of translation are combined in such a manner as to maintain the wires taut. In order to facilitate the bending and the displacement of the cords in the intervals 73 between rings, it may be of advantage to heat the ply 72 slightly in these areas so as to plasticize the rubber. Thus one obtains a cylindrical ply that can be used as is and transferred to a make-up drum, or unrolled in order to form one or more plies of suitable length suitable for use as the ply 10 or ply 11.

Figure 11:
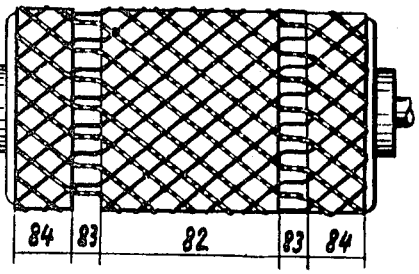

In another embodiment, one can combine the making up of a carcass with the manufacture of plies of inclined cords comprising straight portions. This embodiment is shown in FIGS. 7, 9, 10 and 11. As in the preceding embodiment, one starts with one ply 72 wound over a cylinder with three rings 70, 71, 71', which this time is the make-up drum proper. In the first phase, one operates as in the preceding case. However, now the rings 71 and 71' are no longer turned through the angle beta but by the angle 2×beta while at the same time the rings 71 and 71' are separated from the ring 70 during the first half of the rotation and brought nearer to each other again by the same distance in the course of the second half of the rotation. One obtains a ply which has the configuration shown in FIG. 9 with portions 74 in which the cords are inclined symmetrically to their inclination over the rings 70, 71, and 71'. In a second phase, one lays a second ply 75 symmetrical with respect to the ply 72 in FIG. 7. The two plies are made to adhere to each other. In a third phase, the two rings 71 and 71' are turned by an angle beta in the direction opposite to the direction of rotation applied during the first phase while at the same time the rings 71 and 71' are again spaced apart. As FIG. 11 shows, one obtains an aggregate of two superimposed plies comprising a center zone 82 with crossed inclined cords, two intermediate zones 83 with straight cords and two lateral zones 84 with crossed inclined cords. The reinforcement thus formed can then be removed in order to continue the fabrication of the tire over a specialized piece of equipment or the fabrication can be continued by means of equipment that serves to modify at selected points the direction of the cords of the plies.

Figure 12:
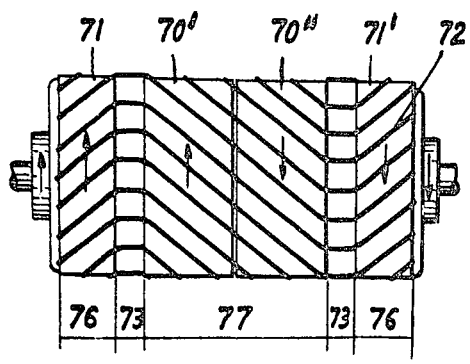

Another embodiment of a ply with off-set inclined cords and another embodiment of a method of producing such a ply is shown in FIG. 12. In this embodiment, the ring 70 is divided into two half-rings 70' and 70" capable of being made integral or movable with respect to each other around a common axis, as desired.

After a ply 72 has been laid around the four rings, as shown in FIG. 7, and the portions 73 of the cords in the spaces between rings, as described above, have been put in a perpendicular position so as to obtain a ply such as the one shown in FIG. 8, the rings 71 and ring 70' on the one hand 71' and 70" on the other are simultaneously turned in opposite directions. Care is taken that any axial displacement of the rings 71 and 71' in relation to the half-rings 70' and 70", respectively, is avoided and that the aggregate 71 and 70' is displaced in relation to the assembly 71' and 70" in such a manner as to preserve the tension of the cords over the half-rings 70' and 70" during their rotation.

The movement is continued until the direction of the wires in the zone carried by the rings 70' and 70" is reversed, as shown in FIG. 12. In this embodiment, the change of direction of the cords in the center portion 77 in relation to the portions 76 requires that the ply 72 be loose in its portion 77 with respect to the rings 70' and 70" and immobilized with respect to the rings 71 and 71' in the corresponding portions 76 and with respect to the outer portions of the rings 70' and 70".

It is possible to obtain in a similar manner plies of inclined cords comprising sections of wires in a perpendicular position, wherein the angle of the cords in the inclined sections is not the same in all such sections. In particular, the embodiment of FIG. 12 shows how one can modify the direction of the inclined cords in the center portion of the ply, which modification can be easily undertaken so as to impart to the inclined cords in that region in the center any desired angular inclination whatever.

Thus there is provided in accordance with the invention a novel and highly-effective tire cover having the principal advantages of bias-carcass tires while avoiding the principal shortcomings of such tires.

I claim:

1. In a tire cover comprising a pair of sidewalls, a crown portion connecting radially-outer edges of said sidewalls, and a pair of bead wires in the region of the radially-inner edges of said sidewalls, the improvement comprising a reinforcement including an even number of superimposed plies extending continuously from one of said bead wires through said sidewalls and crown portion to the other of said bead wires, said plies being anchored about said bead wires, said reinforcement defining in each of said sidewalls a zone of flexibility extending over a short height between the part of each of said sidewalls having maximum axial displacement and the part of each of said sidewalls adjacent to said crown portion having maximum curvature in a radial plane, said plies comprising cords deviating by no more than 15° from the radial direction in said zone of flexibility, said cords over the remainder of their path being in crossed relation with respect to the cords of adjacent plies and deviating from the radial direction by more than 15°, and said cords being inclined with respect to the longitudinal direction by 20° to 60° over substantially all of the portion in each sidewall extending from the corresponding bead wire to the part of each of the sidewalls having maximum axial displacement and by 10° to 30° over substantially all of the region of said reinforcement extending between said two zones of maximum curvature.

2. A tire cover according to claim 1 wherein the height of said zone of flexibility is between one-fourth and one-third of the radial height of said reinforcement.

3. A tire cover according to claim 1 wherein said cords are blocked in the region of the median plane.

4. A tire cover according to claim 1 wherein each substantially radial portion of each cord has a length ranging from 1% to 12% of the total length of the cord.

5. A tire cover according to claim 1 wherein each substantially radial portion of each cord has a length of about 5% of the total length of the cord.

6. A tire cover according to claim 1 further comprising at least one additional ply folded back over itself in a fortified zone bordered at least on one side by a circumferential line of change of direction of said cords, said additional ply comprising cords parallel to the cords of said reinforcement in said fortified zone, whereby said circumferential line of change of direction coincides approximately with the line of folding of said additional ply.

7. A method of manufacturing tire covers comprising the steps of winding on a make-up drum an even number of plies of cords, inclining the cords to the edges of the plies in outer segments and a middle segment, extending the cords in a direction perpendicular to the edges of the plies in a pair of intermediate segments respectively between the middle segment and one of the outer segments and the middle segment and the other of the outer segments, aligning the intermediate segments of each ply with the corresponding intermediate segments of the remaining plies, and adhering the plies together.

8. A method of manufacturing tire covers according to claim 7 further comprising the steps of positioning at least one folded-back ply of cords on the building drum, the crease of said folded-back ply coinciding approximately with a line of change of direction of said cords of the first-named plies and disposing the cords of said folded-back ply at the same angle with respect to the axis of the building drum as the cords of the first-named plies in the zone whereat the folded-back ply is positioned.

References Cited

UNITED STATES PATENTS 3,074,455    1/1963    Richey _____ 152—356
3,275,056    9/1966    Menell _____ 152—356
3,292,681    12/1966    Travers _____ 152—354

DRAYTON E. HOFFMAN, Primary Examiner

R. A. BERTSCH, Assistant Examiner